(12) United States Patent
Poizner et al.

(10) Patent No.: US 7,739,742 B2
(45) Date of Patent: Jun. 15, 2010

(54) THEFT PROTECTION METHOD AND PROMOTION SYSTEM FOR AUDIO MEDIA

(76) Inventors: Lionel Poizner, 95 Armour Blvd., Toronto, Ontario (CA) M3H 1L7; Albert Chosky, 7217 Hayesorangeville Rd. NE., Burghill, OH (US) 44404

(*) Notice: Subject to any disclaimer, the term of this patent is extended or adjusted under 35 U.S.C. 154(b) by 1110 days.

(21) Appl. No.: 11/307,336

(22) Filed: Feb. 1, 2006

(65) Prior Publication Data
US 2008/0069352 A1    Mar. 20, 2008

Related U.S. Application Data

(60) Provisional application No. 60/649,299, filed on Feb. 1, 2005.

(51) Int. Cl.
*H04L 9/00* (2006.01)
(52) U.S. Cl. .................. 726/26; 726/27; 713/176
(58) Field of Classification Search ............ 380/232, 380/200–205, 217, 241; 382/100; 709/231; 707/100; 725/87; 713/201, 176, 189; 726/26–27, 726/30–31; 705/57–59
See application file for complete search history.

(56) References Cited

U.S. PATENT DOCUMENTS 6,449,367 B2 * 9/2002 Van Wie et al. .......... 380/232

| | | | | |
|---|---|---|---|---|
| 2001/0031066 A1 * | 10/2001 | Meyer et al. | ............... | 382/100 |
| 2001/0037465 A1 * | 11/2001 | Hart et al. | .................. | 713/201 |
| 2003/0018796 A1 * | 1/2003 | Chou et al. | ................. | 709/231 |
| 2003/0210803 A1 * | 11/2003 | Kaneda et al. | ............. | 382/100 |
| 2003/0229900 A1 * | 12/2003 | Reisman | ................... | 725/87 |
| 2005/0021539 A1 * | 1/2005 | Short et al. | ................ | 707/100 |

\* cited by examiner

*Primary Examiner*—Hosuk Song
(74) *Attorney, Agent, or Firm*—Michael L. Greenberg, Esq.; Greenberg & Lieberman LLC (57) ABSTRACT

A theft protection method and promotion system for audio media for providing a secure and irreversible way to protect audio containing media content, while supplying an enhanced promotional potential. The inventive device includes a proposed process for the preparation and digital conversion of initial unprotected audio media, a method for producing an irreversibly encrypting waveform to be embedded into audio media, a method for producing a waveform that audibly nullifies the encrypting waveform, a process for the down-sampling and encoding of protected material, and a distribution and promotion system that provides a means by which an end user can access and interact with the protected material.

6 Claims, 7 Drawing Sheets

THEFT PROTECTION METHOD AND PROMOTION SYSTEM FOR AUDIO MEDIA

CONTINUITY DATA

This is a non-provisional patent application of provisional patent application No. 60/649,299 filed on Feb. 1, 2005, and priority is claimed thereto.

FIELD OF THE INVENTION

The present invention relates generally to audio protection systems and more specifically it relates to a theft protection method and promotion system for audio media for providing a secure and irreversible way to protect audio containing media content, while supplying an enhanced promotional potential.

BACKGROUND OF THE INVENTION

It can be appreciated that audio protection systems have been in use for years. Typically, audio protection systems are comprised of audio watermarking systems based upon hidden, embedded information and copy control processes. In addition, there have recently been introduced several audio/video file formats that utilize heavily guarded, although reversible, encryption algorithms. The main problem with conventional audio protection systems is that watermarking technology is antiquated. It is ineffective for modern intellectual property protection. The earliest recorded use of a watermark can be traced to Bologna, Italy in 1282. Despite its ancient origins, all current watermarking technology is based heavily upon this original method. While watermarking may have been efficacious nearly 800 years ago, society, technology, law, and the tools a potential thief uses to steal another person's work have become exceedingly more sophisticated. Watermarking was never intended as a means to prevent theft. It was, and still is, merely an instrument to help prove ownership once a theft has occurred, and the damage from that theft has already been suffered.

Another problem with conventional audio protection systems are that in an attempt to transform watermarking into a more commercially viable solution, several companies have begun to add embedded information inside of the protected product with the intention of limiting a user's ability to copy the material illegally. To make such a system successful would require millions of dollars a year in watchdog lawsuits, expensive and complicated hardware and software designed specifically to work with the invention, and an ability to enforce a law that all consumers, electronic product manufactures, and software companies worldwide must produce only technology that conforms precisely to the functionality of the invention. For if only one company on the planet sells a hardware/software product that does not license and conform to the invention, the invention is made completely ineffectual. Despite costly investments in both time and money, watermarking still remains only a future 'promise' of the intellectual property protection that companies and individuals need today. Another problem with conventional audio protection systems are that virtually all current encryption routines are designed exclusively around reversible algorithms. This has been done, so that certain products, whether software or hardware, can be capable of playing the encrypted object for an end user's enjoyment. There is an old saying that "what can be hacked will be hacked". As of this date, every publicly released reversible encryption audio media file format has been hacked, eliminating the brief benefits of security the algorithm once provided.

In these respects, the theft protection method and promotion system for audio media according to the present invention substantially departs from the conventional concepts and designs of the prior art, and in so doing provides an apparatus primarily developed for the purpose of providing a secure and irreversible way to protect audio containing media content, while supplying an enhanced promotional potential.

SUMMARY OF THE INVENTION

In view of the foregoing disadvantages inherent in the known types of audio protection systems now present in the prior art, the present invention provides a new theft protection method and promotion system for audio media construction wherein the same can be utilized for providing a secure and irreversible way to protect audio containing media content, while supplying an enhanced promotional potential.

The general purpose of the present invention, which will be described subsequently in greater detail, is to provide a new theft protection method and promotion system for audio media that has many of the advantages of the audio protection systems mentioned heretofore and many novel features that result in a new theft protection method and promotion system for audio media which is not anticipated, rendered obvious, suggested, or even implied by any of the prior art audio protection systems, either alone or in any combination thereof.

To attain this, the present invention generally comprises a proposed process for the preparation and digital conversion of initial unprotected audio media, a method for producing an irreversibly encrypting waveform to be embedded into audio media, a method for producing a waveform that audibly nullifies the encrypting waveform, a process for the down-sampling and encoding of protected material, and a distribution and promotion system that provides a means by which an end user can access and interact with the protected material. The preparing method is a process for preparing and converting the initial unprotected audio containing media material. The encryptor is a specialized waveform used to encrypt an audible alert signal into an audio containing media product in an irreversible manner. The key is a precise waveform with the novel property of being able to audibly nullify the encrypted alert sound produced by the encryptor. The down-sampling method is a process for down-sampling and encoding the changes made to the unprotected audio containing media and key. The distribution container is a hardware and/or software process used to facilitate the playback and end-user interaction with the protected audio containing media.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a theft protection method and promotion system for audio media that will overcome the shortcomings of the prior art devices.

An object of the present invention is to provide a theft protection method and promotion system for audio media for providing a secure and irreversible way to protect audio containing media content, while supplying an enhanced promotional potential.

Another object is to provide a theft protection method and promotion system for audio media that provides a modern, irreversibly encrypted method of distributing protected audio containing media through both offline (hardware) and online (software) means.

Another object is to provide a theft protection method and promotion system for audio media that places control of an owner's work directly into his/her own hands, eliminating the need for the owner to license the work to a large company, and minimizes losses incurred from substantial cost and transferal of personal rights that follow such an arrangement.

Another object is to provide a theft protection method and promotion system for audio media that provides a method by which audio containing material can be quickly and cost effectively protected in such a way that stolen protected audio media cannot be burned to CD and listened to using traditional playback devices.

Another object is to provide a theft protection method and promotion system for audio media that grants the audio media's owner a new ability to promote his product using full, stand-alone, and/or free samples, in a way that can induce consumers to enjoy viewing the work, without the current risk of losing all profits due to theft.

Another object is to provide a theft protection method and promotion system for audio media that does not require a complicated international licensing coalition, or the need for external electronic hardware and software company support, in order for the protection to be effective and secure.

Another object is to provide a theft protection method and promotion system for audio media that furnishes a method to help protect an owner's intellectual property so that it does not fall prey to a situation similar to the rampant Internet file sharing theft that the music and movie industries are currently facing.

Another object is to provide a theft protection method and promotion system for audio media that works to protect an owner's audio containing material by slowing and/or stopping piracy at the source, instead of merely waiting for it to happen, simply to provide additional tools for the owner to use during costly legal battles.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Turning now descriptively to the drawings, in which similar reference characters denote similar elements throughout the several views, the attached figures illustrate a theft protection method and promotion system for audio media, which comprises a proposed process for the preparation and digital conversion of initial unprotected audio media, a method for producing an irreversibly encrypting waveform to be embedded into audio media, a method for producing a waveform that audibly nullifies the encrypting waveform, a process for the down-sampling and encoding of protected material, and a distribution and promotion system that provides a means by which an end user can access and interact with the protected material. The preparing method is a process for preparing and converting the initial unprotected audio containing media material. The encryptor is a specialized waveform used to encrypt an audible alert signal into an audio containing media product in an irreversible manner. The key is a precise waveform with the novel property of being able to audibly nullify the encrypted alert sound produced by the encryptor. The down-sampling method is a process for down-sampling and encoding the changes made to the unprotected audio containing media and key. The distribution container is a hardware and/or software process used to facilitate the playback and end user interaction with the protected audio containing media.

Figure 1:
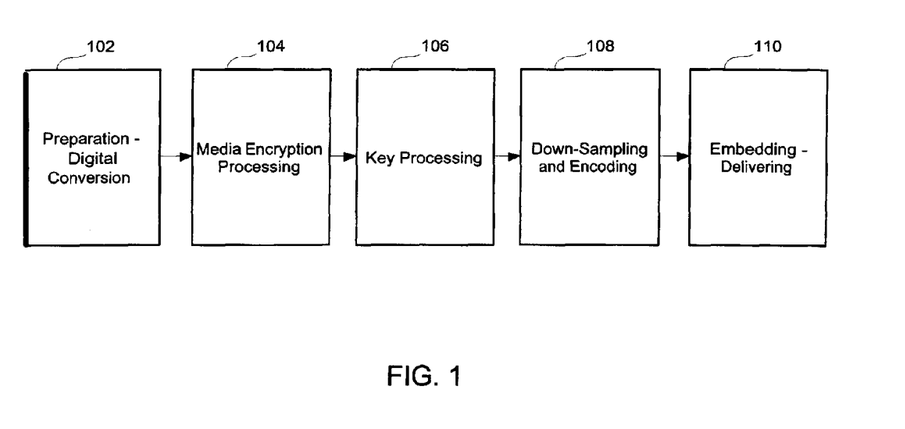
FIG. 1 is a flowchart view of the main processes needed to protect and promote audio containing material.

The preparing method is a process for preparing and converting the initial unprotected audio containing media material. As shown in FIG. 1, a preparation and digital conversion process 102 is the first step to the successful implementation of any audio related service or product. Digital conversion and proper preparation of audio containing media is common knowledge among any layperson working within this field, as well as by most audio-related artists themselves.

Figure 2:
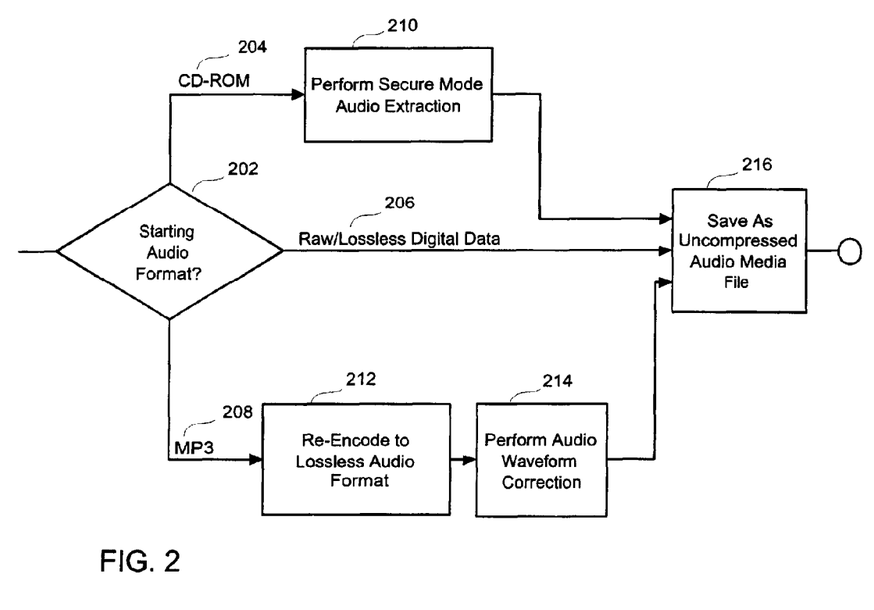
FIG. 2 is a flowchart illustrating the preparation and digital conversion step.

Therefore, I will focus this description on the "best mode" method I currently favor, illustrated in flowchart form in FIG. 2. A starting audio format 202 can be of an ever-growing number of different file formats. This group can be broken down into three primary categories, a CD-ROM and previous published non-lossy format 204, a raw/non-lossy data format 206 that is already saved in a workable digital form such as AVI or WAV, and a MP3 or other lossy format 208. If the starting audio format 202 comes from CD-ROM and previous published non-lossy formats 204, a secure mode audio extraction process 210 is performed using common audio extracting software that is ordinarily used and understood by anyone skilled in the art of audio editing. This secure mode audio extraction process 210 is intended to transform the unprotected audio containing media into a digital format that is the closest copy of the original content and easily editable in later steps of the overall invention procedure. If the starting audio format 202 comes from MP3 or other lossy formats 208, the material is re-encoded to a lossless audio format 212. An audio waveform correction process 214 is then performed upon the lossless audio format 212 in order to remove as many erroneous audible defects as possible. Again, the procedure used to accomplish such a general audio editing task is common knowledge to those skilled in the art of this field. The preferred original format is CD-ROM and previous published non-lossy formats 204. However, in the business of digital audio, working with the most opportune format is oftentimes not possible. In the event of the original audio containing media being acquired in raw/non-lossy data formats 206, or after initial preparation of CD-ROM and previous published non-lossy formats 204 or MP3 or other lossy formats 208, a saving procedure 216 is performed as the last step of preparation. The audio containing material is saved in an uncompressed audio file format that lends itself well to further editing using standard audio editing software. One possible variation of the preparing method is the exclusion of the material being re-encoded to a lossless audio format 212 and/or the subsequent audio waveform correction process 214. Another variation is that secure mode audio extraction process 210 is not necessary as several other audio-extraction algorithms can be used to transfer the audio media to a proper workable format.

An additional variation is that the final saving procedure 216 does not have to be in an uncompressed audio file format, in the case where it's decided that a compressed or
encrypted format would be more appropriate.

The encryptor is a specialized waveform used to encrypt an audible alert signal into an audio containing media product in an irreversible manner. As shown in FIG. 1, a media encryption processing method 104 is performed as the second step of protecting audio containing media. This method is illustrated in more detail through FIG. 3. An audio editing session 302 begins by loading the uncompressed audio media file from the final saving procedure 216 into common audio editing software. An analysis of the audio media 304 is performed with the intention of ascertaining a single constant audio tone frequency which, when superimposed onto the unprotected audio file, produces a very annoying audible effect that makes ordinary listening of the protected audio media undesirable. A tone generation feature/plug-in, readily found within most audio editing software, is used for this task. It is important this be done without causing the sound within the original uncompressed audio containing media to have its waveform distorted to the point that it no longer sounds acceptably similar to the original. The reason for this is that a key from a key processing method 106 will be applied in the end product to audibly nullify the alert tone. With the annoying alert sound no longer being heard, any damage that the superimposed tone caused to the original audio containing media's sound will become clearly noticeable. Audio media protected with this invention is intended to be acceptably similar in audio quality as it was before the protection procedure. This is important for the invention to have a viable commercial value. An analysis of the audio media 304 is accomplished by carefully listening to various tone frequencies as they are superimposed live over the uncompressed audio media file. This live superimposing of the test alert tones can be done in most standard-grade professional software audio editing tools. This process is common knowledge to those skilled in the art of audio editing.

Figure 3:
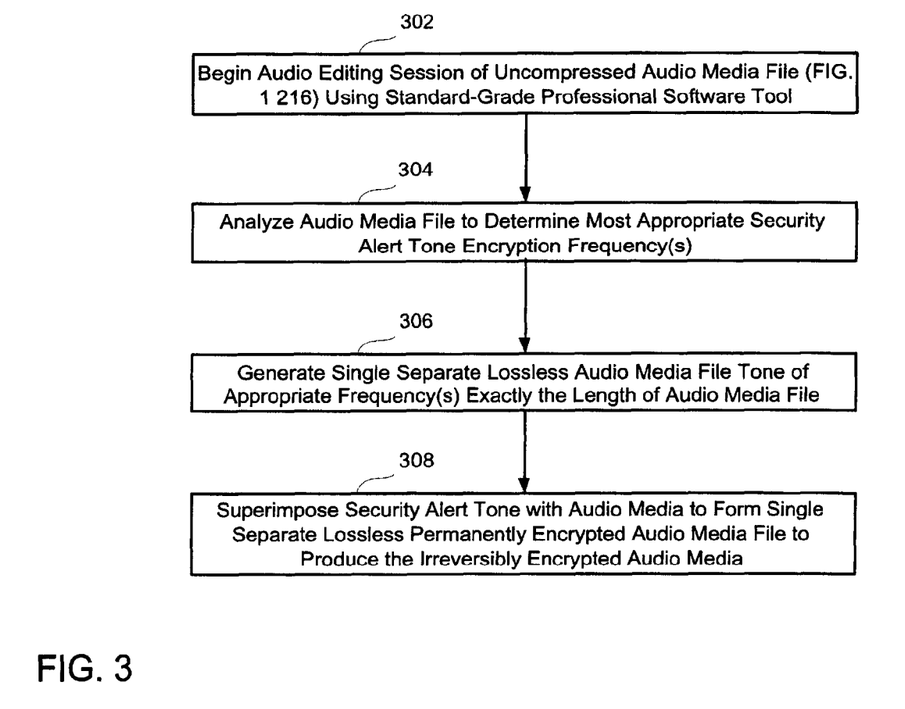
FIG. 3 is a flowchart illustrating the media encryption processing and creation step.

While performing the analysis of the audio media 304, one concentrates not on the annoying tone, but on the underlying original audio media. Some signs that the alert tone is damaging the audio media are echoes, hiccups, sudden spikes of sound, and popping and clicking noises. Echoes or jitters are the most common indication that a particular alert tone is causing damage to the audio media's waveform.

When this occurs, the operator is to try another tone frequency until he or she ascertains a frequency and dB volume that no longer damages the underlying audio media sound beyond acceptable levels. A generation of a single separate lossless audio media file tone 306 is then carried out. As already stated in the previous sentence, this new tone waveform is generated as a separate file, not written over the original uncompressed audio media. The length of the new generated tone is exactly the length of the audio media that is to be protected. The most common settings I have used in the audio media encryption processing method 104 is as follows: Base Frequency 440 Hz, Modulated By 0 Hz, Modulation Frequency 10 Hz, dB Volume in Left and Right Channels −5, Waveform Type Sine, and a varied frequency alert tone properly ascertained according to an analysis of the audio media 304. To complete this step, a superimposing of the security alert tone with audio media 308 is performed using audio editing software to produce a single separate lossless irreversibly encrypted audio media file. This new protected audio media file is then saved to a lossless format for later use. The newly generated alert tone is also saved to its own lossless format file. As superimposing of one waveform over another is standard knowledge among laypersons in this field, the superimposing of the security alert tone with audio media 308 should pose no difficulty. Looking at FIG. 7, there is an illustration of an example waveform of an audio media file 702, and an example waveform of a potential alert tone 704 to be superimposed with it. One possible variation on the media encryption processing method 104 is that the original unprotected audio media can be compressed and/or saved in a lossy format. A variation is that the annoying alert tone does not need to be a single constant generated tone, but instead can consist of a variety of tones mixed together, or another audio media file used as either an annoying sound, warning of theft protection, or combination of alerts thereof. An alert sound can also be a combination of audible content, such as beeps. The decision of whether a particular sound is qualified to be used as an alert sound is that can be audibly nullified to an acceptable level using the key processing method 106. Another possible variation is that an alert sound does not need to be the exact length of the audio media. It can be shorter, intermittent, only at the beginning, or any other combination. Likewise, the superimposing of the alert tone does not have to occur over the entire unprotected audio media. Superimposing may be done only on those parts of the audio media that are deemed fit. Another variation is that the alert tone does not need to be superimposed over all channels of the audio media, but instead over just the left, right, or other combination. Another variation of this method is that the analysis of the audio media 304 can be done using analysis software or other automated technique instead of directly listening to and ascertaining the proper alert tone.

The key is a precise waveform with the novel property of being able to audibly nullify the encrypted alert sound produced by the encryptor.

Figure 4:
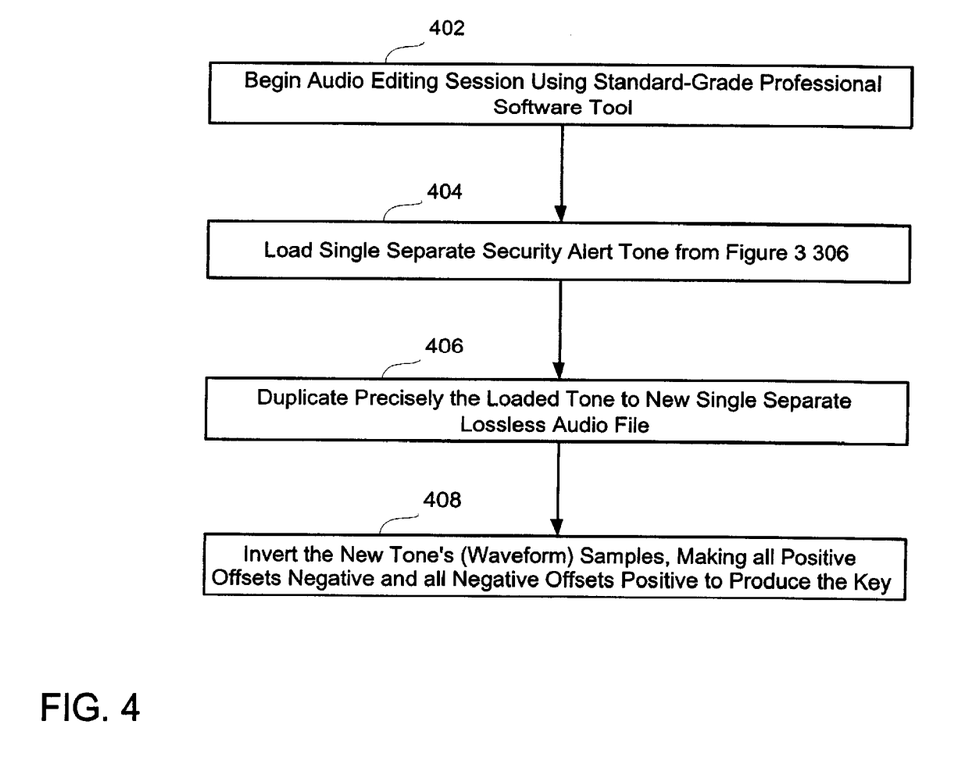
FIG. 4 is a flowchart illustrating the key processing and creation step.

As shown in FIG. 1, a key processing method 106 is performed with the goal of producing a specialized audio key such that, when played at the exact same time as a security alert tone embedded into an audio media file 308, the annoying alert tone is audibly nullified, or cancelled out, allowing the end-user to listen enjoyably to an audibly acceptable facsimile of the original unprotected audio media. In short, the key allows an end user to listen to a protected audio media file without the very annoying alert tone being heard. FIG. 4 shows a flowchart that illustrates the creation of a unique key for a unique irreversibly encrypted audio media file. Each key is created specifically for the matching protected audio media. An audio editing session is started 402 using a standard-grade professional software tool. A loading process 404 involves loading the single separate security alert tone 306. This alert tone was saved when the superimposing of the security alert tone with audio media 308 was completed. A precise duplication of the loaded alert tone 406 is performed. There will now be two opened files within the audio editing software—the loaded alert tone and its copy. The loaded alert tone can now be unloaded, as it is no longer needed for the key processing method 106. An inversion of the duplicate alert tone 408 is the final step to completing the key. To do this involves use of a common feature/plug-in found in standard audio editing software. Inverting a waveform is a simple process for anyone skilled in the art of audio editing. The key's waveform is identical to the alert tone, with the exception of the entire waveform being inverted. This process uses a novel and unexpected result of wave physics that causes an alert tone within the protected audio media to no longer be audible when the key is simultaneously playing. Both the key and protected audio media start to play at the exact same time so that the alert tone and key waveforms are precisely coinciding, each canceling out the other. The inversion of the duplicate alert tone 408 is concluded by saving the new key in a lossless file format.

Figure 7:
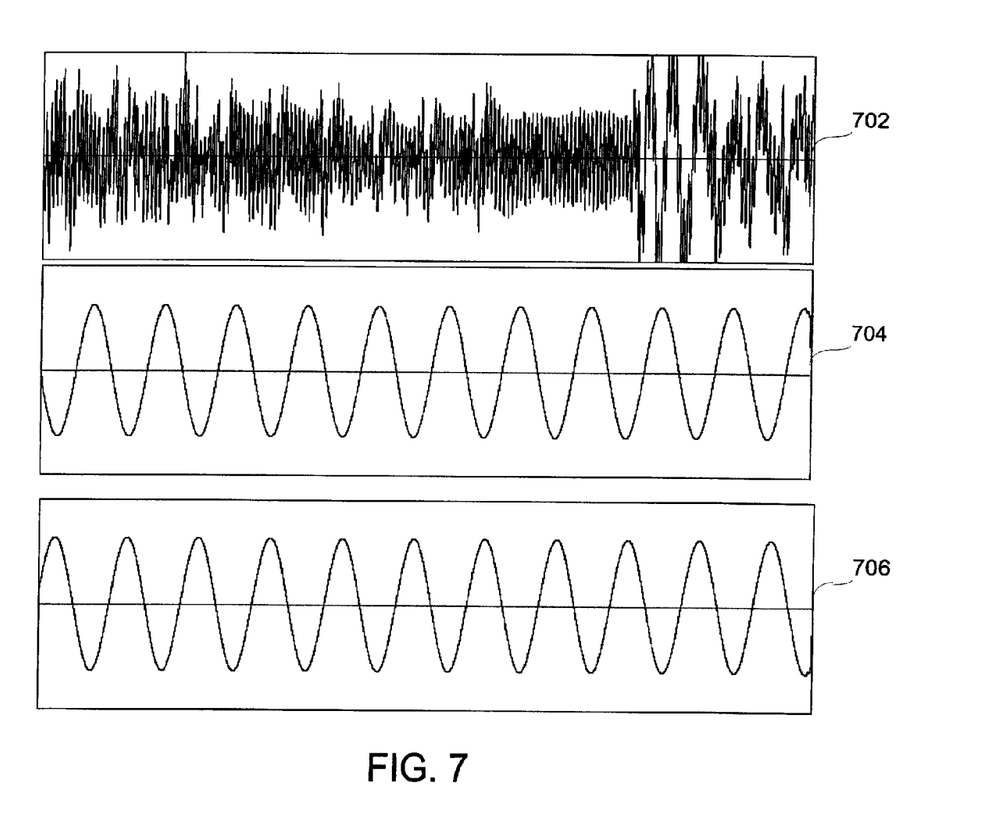
FIG. 7 is an illustration of a sample audio waveform, an encryption waveform, and a key.

Looking at FIG. 7, an example waveform of a potential inverted alert tone to be used as a key 706 is illustrated. One possible variation of the key processing method 106 is that the key is saved in a lossy format after the inversion of the duplicate alert tone 408 is concluded. Another variation is that the key is not generated and saved in the same volume level as the protected audio media. As an example, this could allow the alert tone to be heard as a lower volume background sound. An additional variation is that an automation system can be devised to generate the key at another time within the overall invention process.

Figure 5:
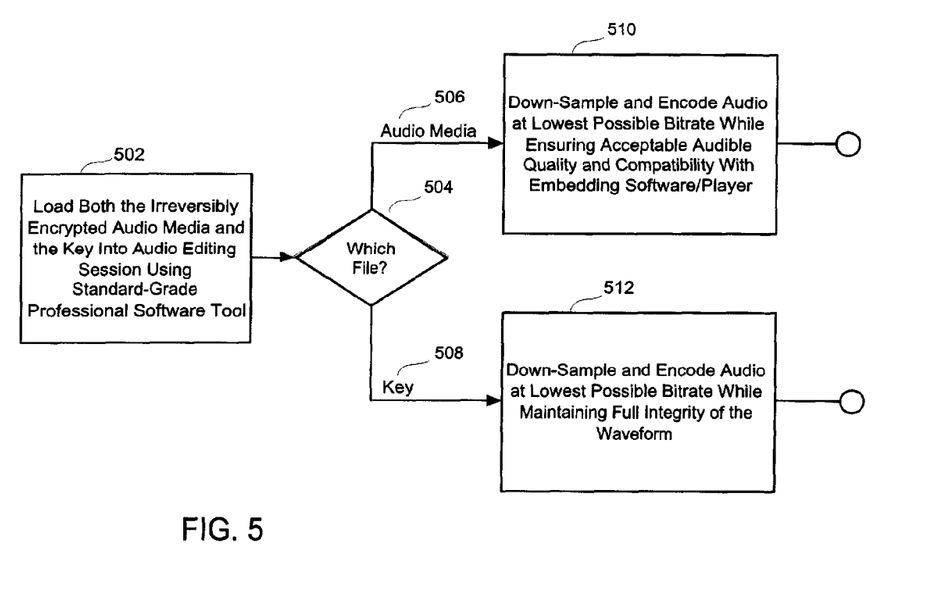
FIG. 5 is a flowchart illustrating the importance of having two separate down-sampling and encryption routines.

The down-sampling method is a process for down-sampling and encoding the changes made to the unprotected audio containing media and key. As shown in FIG. 1, a down-sampling and encoding method 108 plays an important role in uniting the protection portion of the invention to the enhanced promotional advantages it offers after the audio media is protected. FIG. 5 illustrates this step in more detail. A loading of both the irreversibly encrypted audio media and the key 502 is performed using a standard-grade professional audio editing tool. A decision process 504 separates the down-sampling and encoding of the key from that of the protected audio media. Given an audio media file 506, a down-sampling and encoding procedure of the protected audio media 510 is performed. Given a key file 508, a down-sampling and encoding procedure of the key file 512 is performed. The difference between these two separate down-sampling and encoding procedures is that the protected audio media is given strict attention to maintaining a relatively high level of audible quality for the final product.

The key is reduced to the smallest possible file size while still maintaining its audibly nullifying, or canceling, properties. In order to perform a down sampling and encoding procedure of the protected audio media 510, one will use a final down-sampling and encoding setting that is slightly less in quality than the original unprotected audio media. The quality will still be high enough to get enjoyment out of viewing the protected audio media, but not so high as to make the end user believe that the original audio media is not of higher quality than the protected audio media. The reason for this is to supply an enhanced promotional potential to owners of audio media. By doing things this way, the invention will help to instill a desire within end user to seek out the original audio media by other commercial means. A preferred example of this is a musician who protects his songs. The end-user will be given a free copy of the song to enjoy, which will dramatically reduce the urge for the end user to steal the musician's song in the common ways that MP3 songs are currently being stolen. The protected song will not be as high quality as the original song, and possibly not be in stereo. This will install the desire in the end user to purchase the musician's album in order to have access to the full quality music. The purchased album can be stored on a CD that, unbeknownst to the end user, may also be protected using this invention. This can be with a very high quality down-sampling setting, to disable the end user from being able to use readily available CD extraction software to steal the music from the CD he just purchased. It's important to note that as the rest of this patent application is read and understood, the enhanced promotional potential will be even clearer, with further variations on these descriptions becoming apparent. A down-sampling of the key file 512 is performed by reducing the file size of the key as low as possible, while making sure the key still maintains its nullification properties. The importance of this step is illustrated in a embedding and delivering process 110. Down-sampling and encoding of audio media is common knowledge among laypersons in this field. The best method settings I use in the down-sampling and encoding procedure of the protected audio media 510 are as follows: CBR (Constant Bitrate) set to on, MP3 selected as the encoding format, 160 Kbps, 44100 Hz, Stereo 20.1 KHz, (8:8:1), Maximum Bandwidth 20129 Hz; Codec current best quality, Set 'Copyright' Bit. The best method settings I use in the down-sampling and encoding procedure of the key file 512 are as follows: CBR (Constant Bitrate) set to on, MP3 selected as the encoding format, 40 Kbps, 44100 Hz, Stereo (3.9 KHz), Maximum Bandwidth 3911 Hz; Codec current best quality, Set 'Copyright' Bit. After performing the down-sampling and encoding method 108, the operator will have two new files, the protected audio media and the key. These two files are now ready for the final step of the embedding and delivering process 110. One possible variation of the down-sampling and encoding method 108 is that the process of down-sampling and encoding may be automated by either a software and/or hardware system, at the time of this step, or during another phase of the invention implementation process.

Another variation is that the protected audio media may be down-sampled and encoding at any quality deemed fit, as long as the finalized protected audio media and the key continue to function properly for the purposes they are created. An additional variation is that the key does not necessarily need to be down-sampled and encoded for the smallest possible file size when a larger file size is acceptable. A possible variation is that the protected audio media and key do not have to be encoded in any strictly set file format—such as MP3—as long as the two files continue to function for the purposes they were created. The protected audio media and key can even be saved without the preliminary process of encoding and/or down sampling.

Additionally, a variation on the down sampling and encoding method 108 is that the final settings for file down-sampling and encoding may be of a variety of choices. This could include saving the protected audio media and key files without a stereo channel, with lesser or greater maximum bandwidth, at a different bitrate, with or without extra bits set such as the copyright bit, and so on. These choices are dependant mainly upon the targeted embedding and delivering process 110 that will be employed, and upon personal preference. Again, the primary deciding factor being that whatever finalization settings are used, the protected audio media and key should still function for the purposes they were created. Another variation is that enhanced promotional potential is not a necessary requirement; it's an unobvious and potentially advantageous byproduct of the protection process, and can be given more or less focus to depending upon the current situation and the decision maker. For more variations on the embedding and delivering process 110, such as CD-ROM target delivery methods, see the description section immediately following this one. The distribution container is a hardware and/or software process used to facilitate the playback and end-user interaction with the protected audio containing media. As shown in FIG. 1, an embedding and delivering process 110 is performed in order to allow simple and convenient viewing of protected audio media by an end user, and/or to enable enhanced promotional capabilities for the owner of the audio media. This is illustrated in more detail by the flowchart in FIG. 6.

Figure 6:
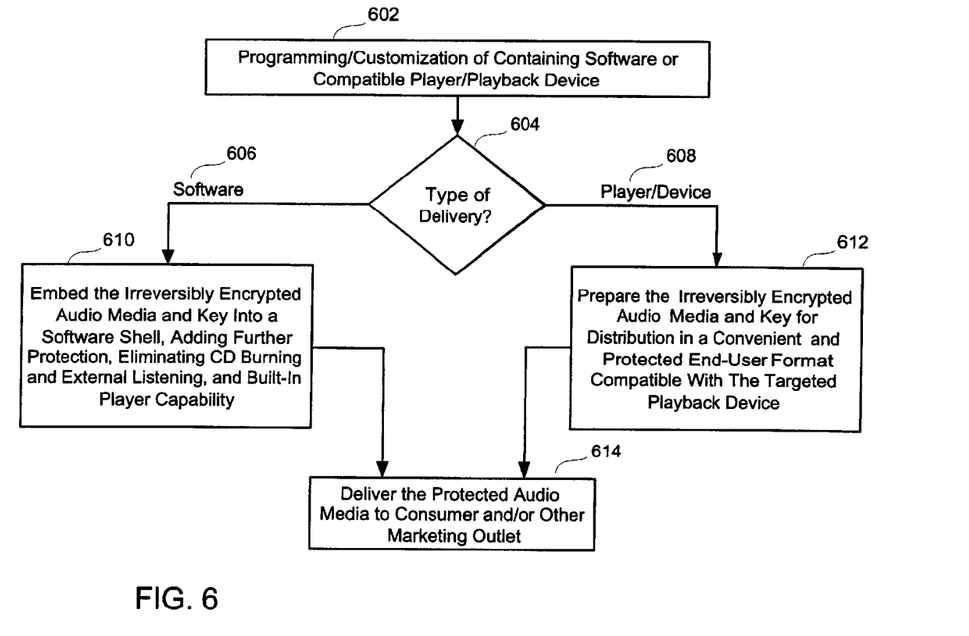
FIG. 6 is a flowchart illustrating a sample for the possibility of embedding and delivering content to end-users.

The starting of a Programming/customization process of containing software or compatible player/playback device 602 is the first step in preparing a protected audio media file for commercial and/or public distribution and use. In conjunction with this step, a decision process for the type of delivery 604 is made. Will the delivery involve a software-based solution 606, or will the delivery involve distribution aimed towards the playback on a compatible hardware based player/playback device 608? In making this decision, the target market is taken into consideration, as well as the subject matter of the audio media, the manner in which the audio media would most advantageously be distributed to the target market, production costs, time investment, and so on. The decision process for the type of delivery 604 is a standard consideration for any company producing a product and deciding how it will be marketed; it is not exclusive to the distribution of this invention.

As such, the methods used to finalize a marketing and distribution strategy are varied according to individual circumstances, and are common knowledge to any layperson skilled in the art of this field. I have included here the best mode method I currently have knowledge of—a method that aims to amply exploit the enhanced promotional advantages of such an irreversibly encrypted protection technology. Important possible variations of this method will be listed as well. A software-based solution 606 is decided upon. The protected audio media file will be delivered to its market in the form of a new way for musicians to protect their work from theft, as well as be able to get samples of their songs into the hands of more potential fans and music industry businesses. This will begin with an embedding process of the irreversibly encrypted audio media and the key into a software shell 610. The software application will act as a built in music player, a marketing tool, and a protective shell to add further difficulty to those considering stealing the musician's work. Creation of such an application involves no more than a general knowledge of programming and the music industry. The importance of this procedure lies more in the implementation than in the technical programming details.

Using standard programming software, an executable application is developed that embeds both the protected audio media and key into itself. This embedding action acts as a protective shell that makes theft of the song even more difficult by turning it into an 'internal concealed' binary form that the majority of potential thieves will not have the knowledge necessary to extract. The software is programmed with the capability, and user interface, to play the protected audio media and key in a familiar manner that common music player software does. The difference here is that the software container has the song(s) embedded within itself in binary form, and does not load them from an external, easier to steal, hard disk location. To add another level of theft protection, the software will use the protected audio media and key as resources that it will only load directly into available RAM on the user's computer. Once again, the protected audio media and key will never be unpacked to a location in the user's hard drive. Most software applications containing large internal resources do not use their embedded resources by loading directly through RAM only. By doing it through RAM, the possibility of theft is reduced even further, as a potential thief would need to be skilled in sophisticated and time consuming memory streaming theft techniques. When the user interface on the software container is accessed by the end user, and the play button is selected, the software will play both the protected audio media and key at the exact same time, making sure that their playback coincides precisely. Then this happens the key will audibly nullify the annoying alert tone that is the irreversible encryption of the audio media. The end user will be able to listen to the song in a pleasant unobstructed manner. If a would-be thief tries to use hacking tools to capture the RAM stream, or extract the protected audio media and key from the executable application, the thief will never steal a song in the form he heard while listening with the software container. Instead, two files will be stolen. These will be the permanently marred audio media file, and the annoying sounding alert tone within the key. Combining these two files with standard audio editing software will necessarily produce a poorer version than heard within the player, and far poorer version than the original song the audio media was processed from. There is no way to revert a song that is encrypted by this invention back to its original state, since the original song is never distributed. This contrasts sharply to other encryption and protection methods for audio media in that their encryption was designed to be reversible. Therefore, no matter how secret their reversing technique is kept, a clever hacker can and will break the security, given enough time, leaving their audio media completely vulnerable to theft.

There is no decryption technique that can break the encryption of an invention that contains only irreversibly encrypted media. If any of the files embedded within the software container are ever stolen, they will be useless to any thief expecting to steal the original song. To those few who would attempt to superimpose the protected audio media and key into a new file, the quality will be noticeably inferior. All of this leads to the enhanced promotion potential of this method, and the goal of inspiring a desire within the end user to buy the musician's album instead of stealing it. Being that the software container/protected audio media combination offers this level of protection, musicians will be able to distribute full songs as samples of their work. Currently most musicians are limited to only being able to present samples of 1-2 minutes long. They do this so the end users will still want to buy their CDs. Unfortunately this has been proven repeatedly to be an ineffective strategy. In the majority of circumstances, if the end user enjoys the shortened sample, he will use common file sharing software to download illegally the full version of the song. When someone has easy access to a full version of the song, the desire to pay for it, instead of taking it free, is reduced to almost nil. To combat this, using this invention, a musician can give out full versions of his song. The musician can do this directly through his website or other means, in such a way that it is far easier to download the full version of the song directly from the musician instead of trying to find it to download illegally. Any protected audio media embedded in a software shell as just described is convenient to use since no other software is needed to view it. It is easier to play a protected audio media file in this manner, than it is to listen to a common MP3 file. The protected and embedded song may be listened to as many times as the end user likes. However, unlike stolen music, the protected song cannot be burned to a CD and listened to through any currently available audio playback device. Recent music industry surveys have shown that over 91% of all end users downloading songs on their computer intend to burn the music to CD so they can listen to it through more traditional means, such as a home/car stereo, portal CD player, or television entertainment center. By eliminating this capability, the desire for the end user to purchase the CD is heightened. A musician can give away all of his protected songs as full unrestricted samples—his entire new album.

Having such easy, legal, and dependable access to their favorite musician's works, end users will prefer to download the music from the owner's website rather than risk legal prosecution and lawsuits from using file sharing software to obtain the files illegally. Once the end user has the songs, they can listen to, and enjoy, them as often as they like. When faced with the urge to listen to the music on a traditional playback device, or to obtain versions of the songs with higher quality encoding settings, the end user will need to purchase the musician's album. The software container is designed utilizing common programming software. Advanced multimedia development toolkits are available for every major programming software product. This will make it easier for the operator of this invention to embed a creative and interesting multimedia presentation directly into the software container, such as a music video, a live connection to the musician's website, an animation, and other eye-catching material. This will add greatly to the perceived value of the samples, and encourage even more end users to choose to download the legal version over that of the illegal one. One example of this is a new version of a music video that the end user cannot see anywhere else unless he downloads the protected song to view it. The promotion potential will increase for the owner, since this will enable the owner to place motion and image advertising into his samples. It will also enable the musician to place a button on the software container's interface so that all viewers of his work are only one 'click' from being taken to the musician's website or order form page. A delivery of the protected audio media to consumer and/or other marketing outlet 614 is performed as the final step. Besides the strategies that were already discussed above and the possible variations listed below, the procedure for delivery of the protected audio media to consumer and/or other marketing outlet 614 is common knowledge to anyone skilled in this art.

One possible variation of an embedding and delivering process 110 is that the protected audio media and key can be delivered to the market on CD-ROM, digital media card, or other compatible storage device. A software-only based delivery method is just one option designed to fulfill a software related need. A possible variation is that a compatible hardware based player/playback device decision 608 can be made over that of a software-based solution 606. In order to implement such a distribution solution an irreversibly encrypted audio media and key preparation method 612 is perform, for distribution in a convenient and protected end user format that is compatible with the targeted playback device. The playback device can consist of hardware and/or software that can read and recognize the protected audio media and key, know how to play the two files correctly with precise coinciding start times, and, if necessary, provide a user interface for end users to interact with the protected content. One specific implementation can be for a musician's protected songs and corresponding keys to be stored on a CD-ROM, and be playable via CD Music players—in hardware and/or software form—that are designed to handle such protected content. Another variation is that the custom software shell can be hand programmed from scratch or a commercial product can be used that offers rapid application (and multimedia) development. Another variation is that the protected audio media and key do not need to be delivered in an executable form. While this technique could forfeit much of the enhanced promotional protection that a protection-embedding container provides, it is fully reasonable to conclude that there will be circumstances where an executable container may not be practical, or may be undesirable. A variation is to embed the protected audio media, key, and/or other content into a custom file format that will then be accessed by a playback device or player software.

As an alternative to the best mode distribution procedure described above, a useful variation can be that the software or hardware based playback device can have the ability to read encrypted/non-encrypted instructions embedded within the protected audio media, predetermined algorithm, or other accompanying material, and from this set of instructions generate the necessary nullify key so that the protected audio media may be viewed in an unobstructed manner. This key can either be generated and played on the fly, or generated first, and saved to either memory, or a hard disk location, from which to be played in a precise coinciding manner with the protected audio media. This technique will help to reduce file size. A variation on an embedding and delivering process 110 is that a usage limit can be placed on the distributed protected audio media. This usage can be implemented through common hardware based watermark detection techniques, or software based usage counting. Another variation is that a time limit can be placed on protected audio media in such a way that the end user can be allowed only a given number of simultaneous minutes/seconds to view the distributed material. Another variation is that the protected audio media and key do not need to be distributed as samples. There can, and very likely will be, situations when the protected audio media can be sold in the form of the distributed software container. In such a system, the container can function as a means to prevent an end user from completely viewing the audio media or its accompanying multimedia presentation/content, until the song is officially purchased and a serial number entered into the distributed container. One advantageous mode for using such a solution can be for the container to allow shortened amount of listening time before being purchased. This will provide a means by which the distribution container can operate as both sample container and sales product container. The nature of the distribution container makes it easy for an operator to design a means for the end user to order and/or pay for the protected audio media directly within the distribution container itself.

Another variation on an embedding and delivering process 110 is that a key does not need to be unique to a specific audio media; multiple protected audio media can share the same key. An additional variation is that the protected audio media and key do not need to be kept as internal resources. Another variation is that the protected audio media and key do not need to be loaded exclusively into RAM. A preparation and digital conversion process 102 is the first step. A starting audio format 202 is chosen by deciding upon one of three sub-processes, a CD-ROM and previous published non-lossy format 204, a raw/non-lossy data format 206, or a MP3 or other lossy format 208. If the starting audio format 202 comes from a CD-ROM and previous published non-lossy format 204, a secure mode audio extraction process 210 is performed. If the starting audio format 202 comes from MP3 or other lossy formats 208, the material is re-encoded to a lossless audio format 212. An audio waveform correction process 214 is then performed upon the lossless audio format 212. In the event of the original audio containing media being acquired in a raw/non-lossy data format 206, or after initial preparation of CD-ROM and previous published non-lossy formats 204 or MP3 or other lossy format 208, a saving procedure 216 is performed as the last sub-process of the first step. A media encryption processing method 104 is performed as the second step. As a sub-process, a beginning audio editing session 302 is started by loading the uncompressed audio media file from the final saving procedure 216 into common audio editing software. An analysis of the audio media 304 is performed next. A generation of a single separate lossless audio media file tone 306 is then carried out. To complete the second step, a superimposing of the security alert tone with audio media 308 is performed. A key processing method 106 is performed as the third step. As a sub-process, an audio editing session is started 402. Next, a loading process 404 involves loading the single separate lossless audio media file tone 306. A precise duplicating of the loaded alert tone 406 is performed. An inversion of the duplicate alert tone 408 is the final sub-process of the third step, ending with saving the new key in a lossless file format. A down-sampling and encoding method 108 is the fourth step. As a sub-process, a loading of both the irreversibly encrypted audio media and the key 502 is performed. A decision process 504 separates the down-sampling and encoding of the key from that of the protected audio media. Given an audio media file 506, a down-sampling and encoding procedure of the protected audio media 510 is performed. Given a key file 508, a down-sampling and encoding procedure of the key file 512 is performed as the final sub-process of the fourth step. An embedding and delivering process 110 is performed as the fifth and final step. As a sub-process, a programming/customization process of containing software or compatible player/playback device 602 is performed. In conjunction with this step a decision process for the type of delivery 604 is made from two choices, a software based solution 606 or a compatible hardware based player/playback device 608. If a software based solution 606 is decided upon, an embedding process of the irreversibly encrypted audio media and the key into a software shell 610 is performed. If a compatible hardware based player/playback device solution 608 is decided upon, an irreversibly encrypted audio media and key preparation method 612 for distribution in a convenient and protected end-user format that is compatible with the targeted playback device is performed. A delivery of the protected audio media to consumer and/or other marketing outlet method 614 is the final performed sub-process of the fifth step. One possible variation of the preparation and digital conversion process 102 can be the exclusion of the material being re-encoded to a lossless audio format 212 and/or the subsequent audio waveform correction process 214.

Another variation is that secure mode audio extraction process 210 is not necessary as several other audio-extraction algorithms can be used to transfer the audio containing media to a proper workable format. One possible variation of the media encryption processing method 104 is that the manual analysis of the audio containing media file 304 can be replaced by an analysis sub-process using software or other automated technique instead. One possible variation of the key processing method 106 is that the method of producing the single separate lossless audio media file tone 306 can be replaced by an automation system sub-process that can generate the key before, during, or following, an inversion of the duplicate alert tone 408. One possible variation of the down-sampling and encoding method 108 is that the main process can be skipped when down-sampling and encoding is automated by either a software and/or hardware system, at the time of this step or at the time of a sub-process of another step, or when down-sampling and/or encoding are deemed unnecessary. This invention method and system produces a protection and promotion tool that owners of audio media products can use to help get their work into the hands of their targeted market, prevent their material from becoming stolen during one of the 73,000-145,000 file sharing thefts occurring each day, and/or stop end users from viewing the protected audio media from anywhere except directly through their computers. An end user's interaction with the invention and its functional elements depends upon the final embedding and delivering process 110. If a software-based solution 606 is decided upon, a single executable file will be distributed to the end user. Within this file will be stored the protected audio media and audibly nullifying decryption key. The software container will have a familiar graphical user interface that an end user can access to play the protected audio media, stop it, rewind/fast-forward, and/or any other user interface interactions that will help make using the invention more intuitive. End user operation is made as simple as possible, such that it will consist mainly of running the executable software container, watching and enjoying any embedded multimedia presentations, pressing a play button to begin playing the protected audio media, and clicking any included buttons that can help the user gain more information about the protected audio media and/or find ways in which to order the protected audio media and other related products. If a compatible hardware based player/playback device solution 608 is decided upon, the end user will load the CD-ROM (or other storage media) into his computer. He will then use a hardware/software based combination to view the protected content—the hardware based solution being the storage media reader that is able to recognize and process the protected audio media saved on it; and the software being a viewer application similar in functionality to that discussed above, either embedded on the storage media and launched automatically using auto-run capability, acting as independent viewer software that is operated in a similar manner as other common audio media software, or as a combination of both. The primary functioning of the invention takes place unbeknownst to the end user. Upon running the software, the software container prepares the information and resources it needs to operate efficiently by loading them into the user's system RAM, avoiding the need to write any secure files to the hard disk. This feature increases the difficulty a would-be thief will need to go through in order to try to steal the protected audio media that is embedded within. Next, the software displays any intended animation or multimedia presentation for the enjoyment of the end user, and for the promotional benefit of the protected audio media's owner. Upon receiving the message that the end user has pressed the play button, the software or hardware playback device plays both the protected audio media and it's corresponding key in such a way that both audio waveforms precisely coincide. The addition of the key's tones audibly nullifies the irreversible encryption that was previously performed on the protected audio media. This is accomplished through use of wave physics and the cancellation properties of inverse waves. The result is that the end user is allowed to listen to the protected audio media in an unobstructed manner.

Additional underlying functions of the invention include capabilities for simultaneously stopping the two audio files, fast-forward/rewind them, presenting relevant copyright information, and handling the process of leading the end user, in an advertising manner, towards making a positive purchasing decision for either the protected audio media or other related products.

As to a further discussion of the manner of usage and operation of the present invention, the same should be apparent from the above description. Accordingly, no further discussion relating to the manner of usage and operation will be provided. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A theft protection method for audio media, comprising:
   preparation and digital conversion of audio media on hardware;
   irreversibly embedding a waveform into the audio media, wherein said irreversibly embedding a waveform into the audio media comprises
   beginning an audio editing session of an uncompressed media file;
   analyzing the media file;
   generating a single separate lossless audio media file; and
   superimposing a security alert tone with the single separate lossless audio media file; and
      key processing, wherein said key processing comprises acquiring data to generate inverse waves of the waveform.

2. The theft protection method for audio media of claim 1, further comprising listening to the audio media with the security alert tone unremoved.

3. The theft protection method for audio media of claim 1, further comprising listening to the audio media with the security alert tone and the inverse waves of the waveform.

4. The theft protection method for audio media of claim 1, further comprising listening to the audio media via a playback device that accesses a file.

5. The theft protection method for audio media of claim 1, further comprising listening to the audio media via a playback device that accesses a file to play the inverse waves of the waveform.

6. The theft protection method for audio media of claim 1, further comprising
   listening to the audio media with the security alert tone unremoved;
   listening to the audio media with the security alert tone and the inverse waves of the waveform; and
   listening to the audio media via a playback device that accesses a file to play the inverse waves of the waveform.

* * * * *